United States Patent [19]
Nguyen

[11] Patent Number: 5,276,782
[45] Date of Patent: Jan. 4, 1994

[54] DISPLAY CORRECTOR

[75] Inventor: Wayne H. Nguyen, Yorba Linda, Calif.

[73] Assignee: Hughes Aircraft Company, Los Angeles, Calif.

[21] Appl. No.: 857,693

[22] Filed: Mar. 25, 1992

Related U.S. Application Data

[63] Continuation of Ser. No. 373,854, Jun. 29, 1989, abandoned.

[51] Int. Cl.$^5$ .............................................. G06F 15/00
[52] U.S. Cl. ...................................... 395/118; 315/8; 315/370
[58] Field of Search .......................... 364/518, 521, 522; 340/747, 750; 315/370, 8; 395/127, 128, 136, 118

[56] References Cited

U.S. PATENT DOCUMENTS

| | | | |
|---|---|---|---|
| 4,556,821 | 12/1985 | Cooper | 315/8 |
| 4,580,078 | 4/1986 | Spannhake | 315/8 |
| 4,700,114 | 10/1987 | Sutherland, II | 315/389 |
| 4,853,588 | 8/1989 | Ohtsu et al. | 313/440 |
| 4,864,192 | 9/1989 | Buchwald et al. | 315/8 |
| 4,899,082 | 2/1990 | Sands et al. | 315/8 |

*Primary Examiner*—Phu K. Nguyen
*Attorney, Agent, or Firm*—L. A. Alkov; W. K. Denson-Low

[57] ABSTRACT

A display corrector circuit 40 is disclosed which corrects for defocusing and horizontal and vertical spherical positional distortion of a point 22 upon a flat faced cathode ray tube display 16. The corrector 40 provides a plurality of programmable corrections and is based upon the first three terms of a Taylor series expansion of a polynomial functional representation of positional error.

17 Claims, 4 Drawing Sheets

DISPLAY CORRECTOR

This is a continuation of application Ser. No. 07/373,854, filed Jun. 29, 1989, now abandoned.

BACKGROUND OF THE INVENTION

1. Field of the Invention

This invention relates to a display corrector and, more particularly, to a corrector to be used within a flat faced cathode ray tube display and which compensates for vertical and horizontal positional distortion and defocusing of points contained thereon.

2. Discussion

Flat faced cathode ray tube (CRT) displays are used in a wide variety of electronic applications requiring high accuracy and minimal display errors, such as in airplane displays. While these flat faced displays provide high accuracy, their geometrically flat face causes significant variation in deflection sensitivity and spot size relative to points appearing thereon. This sensitivity variation causes both horizontal and vertical positional distortion or displacement of the displayed points relative to their position upon an ideally spherically shaped display. The spot size variation causes these points to be defocused or blurred upon the display. These difficulties are well known in the art and are commonly referred to as "pin-cushion" distortion and defocusing, and are particularly obvious and troublesome at the turned edges of the flat faced display.

One approach to correcting these difficulties has utilized an electronic corrector embodying a square root approximation of the horizontal and vertical spherical positional error associated with the displayed points. This approach has only proven to alleviate a portion of the total distortion and defocusing while utilizing a complex electronic network which has proven to be relatively costly and subject to error.

SUMMARY OF THE INVENTION

According to the teachings of the present invention, both horizontal and vertical spherical positional distortion and associated defocusing of points upon a flat faced cathode ray tube display may be corrected by relatively simple circuit means electronically coupled to the display.

Specifically, according to the preferred embodiment of this invention, a correction position gain may be modelled as separate horizontal and vertical polynomial functions. Each polynomial function may be thereafter expanded into separate Taylor series type formulations wherein each of these Taylor series is then truncated after three terms. The second term of each of the series may be used to define a horizontal and a vertical positional gain correction respectively. Each of these gains may be implemented by an electronic circuit, coupled to the display, and which may be programmed to define any of a plurality of needed gains.

The third term of each of these truncated series may be used to define a feedback value to be used with the associated correctional gain defined by the second term of the series. Each of these feedback values may be implemented by an electronic circuit, coupled to the display, and which may be programmed to define any of a plurality of feedback values. It has been found that the use of such a feedback mechanism has proven to be advantageous in the reduction of such positional errors. Additionally, the previously alluded to electronic circuitry associated with the positional distortion correction also provides a focusing correction signal to the display.

BRIEF DESCRIPTION OF THE DRAWINGS

For a more complete understanding of the present invention relative to the advantages thereof, reference is now made to the following description taken in conjunction with the accompanying drawings in which:

FIGS. 3 (A) and (B) illustrate an electronic circuit of a display corrector made in accordance with the teachings of the preferred embodiment of this invention.

DESCRIPTION OF THE PREFERRED EMBODIMENT

Figure 1:
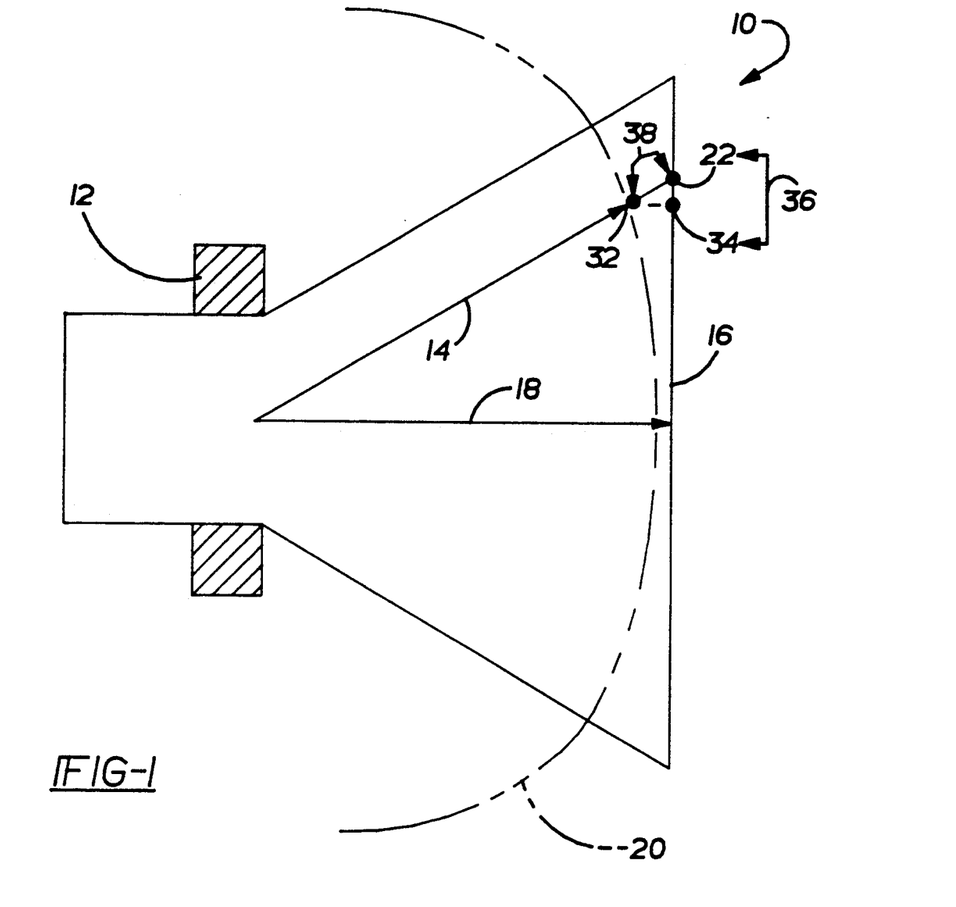
FIG. 1 is a vertical sectional view of a typical cathode ray tube display.

Referring now to FIG. 1, there is illustrated a typical flat faced cathode ray tube display 10 having the usual electron beam generator (not shown) and an annular shaped magnetic yoke 12 which disperses the plurality of beams, such as beam 14, generated by the beam generator onto flat face portion 16 of display 10. The impingement of beam 14 onto display portion 16 produces the usual point 22 thereon.

Display 10 is further shown as having the usual radius 18 defining the distance form the center of yoke 12 to portion 16. Ideal spherical face portion 20 is shown in phantom.

Figure 2:
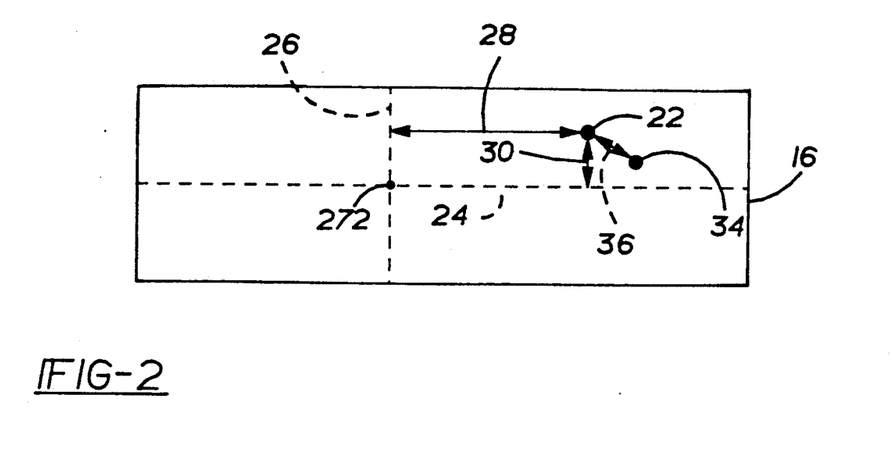
FIG. 2 is a front view of a flat faced cathode ray tube display illustrating horizontal and positional spherical distortion of points thereon.

Referring now to FIG. 2, it is seen that every point 22 appearing upon portion 16 has a vertical and a horizontal positional component defined by a reference horizontal and a reference vertical axis (24 and 26 respectively) placed upon portion 16 at the center of the tube 10. Specifically, horizontal position component 28, of point 22, is defined as the horizontal distance that point 22 is positioned away from axis 26. Similarly, the vertical position component 30, of point 22, is defined as the vertical distance that point 22 is positioned away from axis 24.

It is known however, as previously alluded to, that point 22 is both horizontally and vertically spherically distorted relative to its position upon portion 16. That is, positional components 28 and 30 are of different values depending upon the geometry of portion 16 (i.e. either spherical or flat). Thusly, point 22 appears to be at a different position upon flat faced portion 16 then it would be if portion 16 were truly spherical in shape. Additionally, it is also known that point 22 is defocused upon flat faced portion 16 relative to an ideally spherically shaped portion.

To illustrate, reference is now made again to FIG. 1. As shown, beam 14, which impinges upon portion 16 thereby causing point 22 to appear thereon, would impinge ideal spherically shaped portion 20 at point 32 thereon.

The projection of point 32 upon portion 16 is defined by point 34 and the distance 36 defined by the difference of the horizontal and vertical positional components (28, 30) of point 22 with the corresponding horizontal and vertical positional components of point 34 represents the horizontal and vertical spherical positional distortion of point 22. Further, the distance 38 between points 32 and 22 represent a defocusing of point 22 relative to point 32.

It is well known that the horizontal positional component of point 32 is mathematically related to the horizontal positional component 28 of point 22 in the following manner:

$$X' = \frac{X}{\sqrt{1 + \frac{X^2 + Y^2}{R^2}}} \quad \text{(Equation 1)}$$

Further, the vertical positional component of point 32 is known to be related to the vertical positional component 30 of point 22 in the following manner:

$$Y' = \frac{Y}{\sqrt{1 + \frac{X^2 + Y^2}{R^2}}} \quad \text{(Equation 2)}$$

In each of these two aforementioned mathematical relationships "X'" denotes the horizontal positional component of point 32, "Y'" denotes the vertical positional component of point 32, "Y" denotes positional component 30 of point 22, "X" denotes positional component 28 of point 22, and "R" denotes the distance associated with radius 18 of display 10.

It is also well known that the horizontal and vertical positional components of a point 22 upon display portion 16 may be controlled by an amount of voltage drive that is proportional to current through yoke 12. This is due to the fact that yoke current controls the amount of dispersion of beam 14. Thusly, a display convertor made in accordance with the teachings of the preferred embodiment of this invention controls spherical positional distortion of point 22 by controlling the drive voltage to yoke 12.

Thusly, the preferred embodiment of this invention models the voltage necessary for a undistorted position of point 22 in the following manner:

$$X'(v) = X_v - G_x A_x \quad \text{(Equation 3)}$$

$$Y'(v) = Y_v - G_y A_y \quad \text{(Equation 4)}$$

Where "X'(v)" denotes the drive voltage of yoke 12 necessary to achieve an undistorted horizontal positional component 28 of point 22 and "Y'(v)" denotes the drive voltage of yoke 12 necessary for an undistorted vertical positional component 30 of point 22. "$X_v$" and "$Y_v$" denote voltages of yoke 12 associated with the current distorted horizontal and vertical distorted positions of point 22, "$G_x$" and "$G_y$" denote gains associated with correcting the positional distortion of point 22, and "Ax" and "Ay" denote a polynomial function. Specifically, equations 3 and 4 represent polynomial functional approximations of equations 1 and 2 respectively.

Furthermore, in the preferred embodiment of this invention "Ax" and "Ay" are defined as follows:

$$Ax = \frac{X_v \frac{[X_v^2 + Y_v^2]}{K^2}}{1 + K'_x \frac{[X_v^2 + Y_v^2]}{K^2}} \quad \text{(Equation 5)}$$

and $$Ay = \frac{Y_v \frac{[X_v^2 + Y_v^2]}{K^2}}{1 + K'_y \frac{[X_v^2 + Y_v^2]}{K^2}} \quad \text{(Equation 6)}$$

Where "$X_v$" and "$Y_v$" are defined as specified above and where "$K'_x$" and "$K'_y$" are defined to be feedback factors. "K" is a multiplier factor and in the preferred embodiment of this invention is empirically found to be 10.

By expanding equations 3 and 4 into separate Taylor series expansions, equating thereafter the first three terms of this expansion with the first three terms of Taylor series expansions of equations 1 and 2 and further defining "$G_x$"="$G_y$"=second Taylor series term of each of the series one obtains the following:

$$G_x = G_y = \frac{K^2}{2R^2 C^2} \quad \text{(Equation 7)}$$

Where "K" and "R" are as specified above (K is usually 10) and where "C" is a proportionality factor uniquely associated with the yoke driver circuit (not shown). Similarly, by allowing the feedback factors ($K_x$, $K_y$) to be defined by the third term of each Taylor series and assuming that the beam is scanning symmetrically in all directions one obtains the following:

$$K_x = K_y = \frac{3K^2}{4C^2 R^2} \quad \text{(Equation 8)}$$

Where K, R, and C are as previously defined.

Figure 3A:
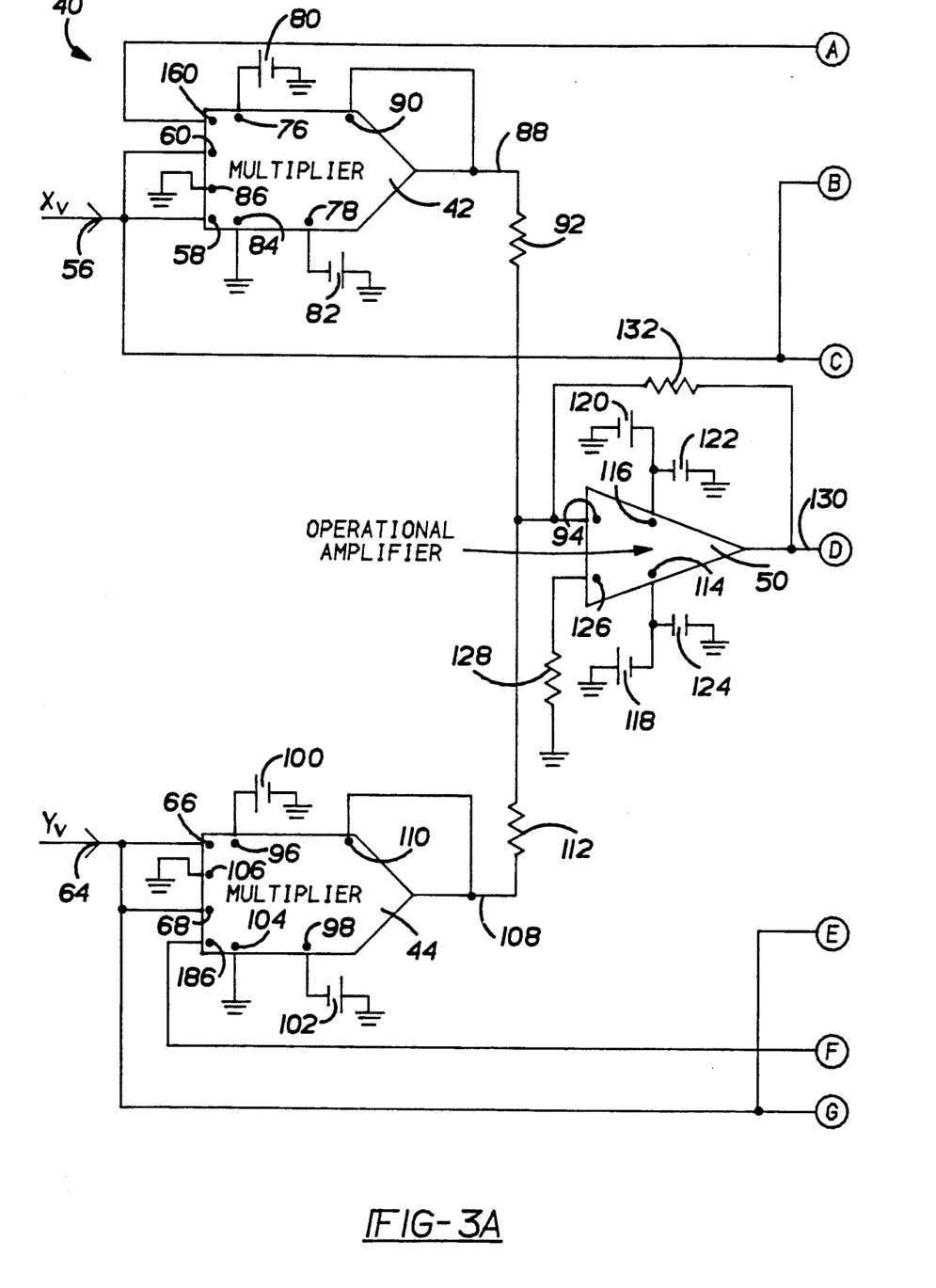
Figure 3B:
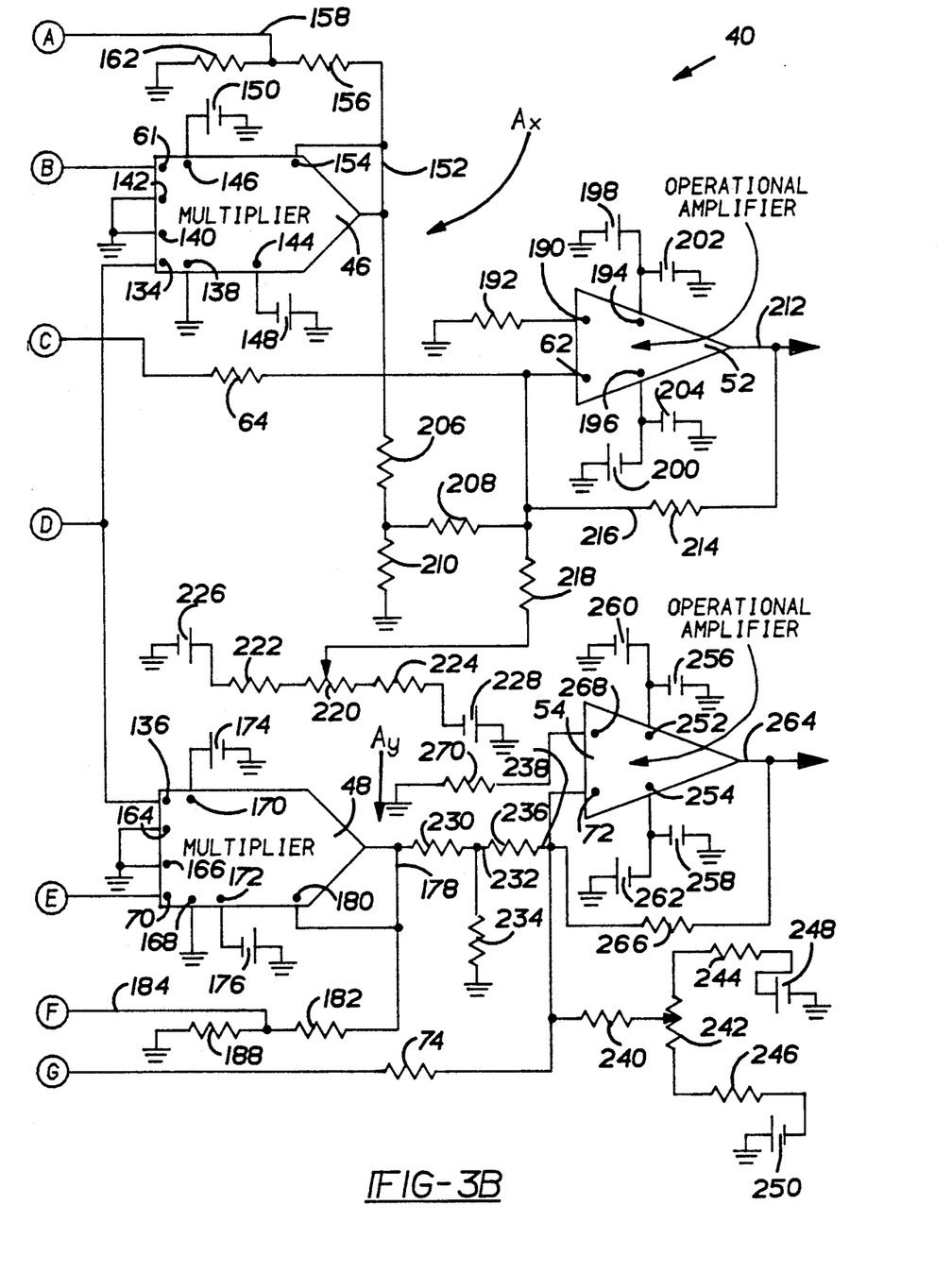

Reference is now made to FIGS. 3 (a) and (b) which show a display corrector circuit 40 made in accordance with the teachings of the preferred embodiment of this invention and having multipliers 42-48 and operational amplifiers 50-54 electronically coupled within a cascaded arrangement.

Specifically, input signal on line 56 representing "$X_v$" is electronically coupled to the fourth pin 58 and tenth pin 60 of multiplier 42, to the tenth pin 61 of multiplier 46, and to the second pin 62 of amplifier 52 through resistor 64. Similarly, signal on line 64 representing "$Y_v$" is coupled to the first pin 66 and to the third pin 68 of multiplier 44, to the third pin 70 of multiplier 48, and to the second pin 72 of amplifier 54 through resistor 74.

The ninth pin 76 and fifth pin 78 of multiplier 42 are coupled to voltage sources 80 and 82 respectively. The sixth pin 84 and third pin 86 of multiplier 42 are coupled to electrical ground. Multiplier 42 produces an output signal on line 88 which is coupled back to the seventh pin 90 of multiplier 42 and is coupled, through resistor 92, to the second pin 94 of amplifier 50.

The ninth pin 96 and fifth pin 98 of multiplier 44 are coupled to voltage sources 100 and 102 respectively and further the sixth pin 104 and tenth pin 106 are both coupled to electrical ground. Output signal on line 108 of multiplier 44 is coupled to its seventh pin 110 and to the second pin 94 of amplifier 50 through resistor 112.

The fourth pin 114 and seventh pin 116 of amplifier 50 are coupled to voltage sources 118 and 120 respectively and to capacitors 122 and 124 respectively. The third pin 126 of amplifier 50 is coupled through resistor 128 to electrical ground.

Amplifier 50 produces output signal on line 130 which is coupled, through resistor 132, to its second pin 94 and to the third pin 134 of multiplier 46 and to the tenth pin 136 of multiplier 48.

The sixth pin 138, fourth pin 140, and first pin 142 of multiplier 46 are coupled to electrical ground. The fifth pin 144 and ninth pin 146 are coupled to voltage sources 148 and 150 respectively. Multiplier 46 produces signal on line 152 which is coupled to its seventh pin 154 and to resistor 156. Resistor 156 produces output signal on line 158 which is coupled to the first pin 160 of amplifier 42 and to resistor 162 wherein resistor 162 is coupled to ground at an opposite end thereof.

The first pin 164, fourth pin 166, and sixth pins 168 of multiplier 48 are coupled to electrical ground. The ninth pin 170 and fifth pin 172 of multiplier 48 are coupled to voltage sources 174 and 176 respectively. Multiplier 48 produces an output signal on line 178 which is coupled to its seventh pin 180 and to resistor 182 which produces output signal on line 184. Signal on line 184 is coupled to the fourth pin 186 of multiplier 44 and to resistor 188 which is grounded at an opposite end thereof.

The third pin 190 of amplifier 52 is coupled to resistor 192 wherein said resistor 192 is coupled to electrical ground at an opposite end thereof. The seventh pin 194 and fourth pin 196 are coupled to voltage sources 198 and 200 respectively and to capacitors 202 and 204 respectively. The second pin 62 of amplifier 52 is coupled to signal on line 152 through resistors 206 and 208. Resistor 210 couples resistor 206 to electrical ground.

Amplifier 52 produces an output signal on line 212 which is coupled to display 10 and to resistor 214 thereby producing signal on line 216. Signal on line 216 is coupled to the second pin 62 of amplifier 52, and to resistor 218. Resistor 218 is coupled to potentiometer 220 which is itself coupled to resistors 222 and 224 at each end thereof. Resistors 222 and 224 are coupled to voltage sources 226 and 228 respectively.

Signal on line 178 is coupled to resistor 230 thereby producing signal on line 232 which is coupled to resistors 234 and 236. Resistor 234 is coupled to electrical ground at an opposite end thereof and resistor 236 produces signal on line 238 which is coupled to the second pin 72 of amplifier 54 and to resistor 240. Resistor 240 is coupled to potentiometer 242 which itself is coupled to resistors 244 and 246 at opposite ends thereof. Resistors 244 and 246 are coupled to voltage sources 248 and 250 respectively. The seventh pin 252 and fourth pin 254 of amplifier 54 are coupled to capacitors 256 and 258 respectively and to voltage sources 260 and 262 respectively. Amplifier 54 also produces output signal on line 264 which is coupled to display 10 and to its second pin 72 through resistor 266. The third pin 268 is coupled to resistor 270 which is coupled to electrical ground an opposite end thereof.

The following table lists some of the specifications associated with components 42–270 as shown in FIG. 3.

|     | Component Type | Specification |
| --- | --- | --- |
| (A) | Multipliers 42–48 | AD534T |
| (B) | Operational Amplifiers 50–54 | HA 2620 |
| (C) | Voltage Sources 80, 100, 120, 150, 174, 198, 226, 248, 260 | +15 Volts |
| (D) | Voltage Sources 82, 102, 118, 148, 176, 200, 228, 250, 262 | −15 Volts |
| (E) | Resistors 92, 112, 132 | 3.09 kohms |
| (F) | Resistor 128 | 976 kohms |
| (G) | Resistors 64, 74, 208, 214, 236, 266 | 5.11 kohms |
| (H) | Resistor 240 218 | 100 kohms |
| (I) | Resistor 222, 224, 244, 266 | 4.99 kohms |
| (J) | Potentiometers 220, 242 | 0–10 kohms |
| (K) | Capacitors 122, 124, 202, 204, 256, 258 | .1 μFarad |

In operation, multipliers 42 and 46 cooperate with amplifier 50 to define "Ax" on signal on line 152. Resistors 156 and 162 define the feedback signal K' in the following manner:

$$K'_x = \frac{R162}{R162 + R156} \quad \text{(Equation 9)}$$

Where R162 denotes the resistance value of resistor 162 and where R156 denotes the resistance value of resistor 156.

Similarly, multipliers 44 and 48 co-operate with amplifier 50 to define 637 Ay" on signal on line 178. Resistors 182 and 188 define the feedback signal K'$_y$ in the following manner:

$$K'_y = \frac{R188}{R188 + R182} \quad \text{(Equation 10)}$$

Where R188 denotes the resistance value of resistor 188 and where R182 denotes the resistance value of resistor 182. In the preferred embodiment of this invention K'$_y$ is equal to K'$_x$.

Signals on lines 152 and 178 (i.e. Ax and Ay) are multiplied with respective G$_x$ and G$_y$ values and then this product is subtracted from their respective distorted positional signal on lines 56 or 64. Output signals on lines 212 and 264 represent corrected positions of point 22 relative to its horizontal and vertical placement respectively.

G$_x$ is defined by resistors 206 and 210 in the following manner:

$$G_x = \frac{R210}{R210 + R206} \quad \text{(Equation 11)}$$

Where R210 denotes the resistance of resistor 210 and where R206 denotes the resistance of resistor 206. Similarly, G$_y$ is defined by resistors 234 and 230 in the following manner:

$$G_y = \frac{R234}{R230 + R234} \quad \text{(Equation 12)}$$

Where R230 denotes the resistance of resistor 230 and where R234 denotes the resistance of resistor 234. In the preferred embodiment of this invention G$_x$ is equal to G$_y$.

It should be appreciated, by one skilled in the art, that K$_x$, K$_y$, G$_x$, and G$_y$ may be programmed by the selection of appropriate resistor values and may define one of a plurality of correction values. This is extremely important in applications in which display correction factors cannot be calculated such as where yoke voltages are immeasurable. This application allows programming by a sequential selection of resistor values so as to define a plurality of values for $G_x$, $G_y$, $K_x$, and $K_y$. The effects of each of these newly defined values upon the focus and position of point 22 are sequentially observed until the correct value is found. This programmability also allows circuit 40 to be utilized with a plurality of displays 10, each display 10 having different needed corrections.

Additionally, it has been empirically discovered that signal on line 130 serves to focus point 22 upon display portion and is of the form:

$$\frac{\frac{X^2_v + Y^2_v}{K}}{1 + \frac{K' X^2_v + Y^2_v}{K^2}} \quad \text{(Equation 13)}$$

Where $X_v$, $Y_v$, $K'$, and $K$ have been previously specified.

Furthermore, signal on line 56 co-operates with potentiometer 220 and resistors 218, 222, and 224 such that corrector 10 may be horizontally calibrated to axis 26 of display 10. Similarly, signal on line 64 co-operates with potentiometer 242 and resistors 240, 244, and 246 such that corrector 10 may be vertically calibrated to axis 24 of display 10.

This calibration is achieved by adjusting potentiometers 220 and 242 until signals on lines 212 and 246 produce a null or zero output at a point 272 defining the intersection of axes 26 or 24 of display portion 16.

Figure 4:
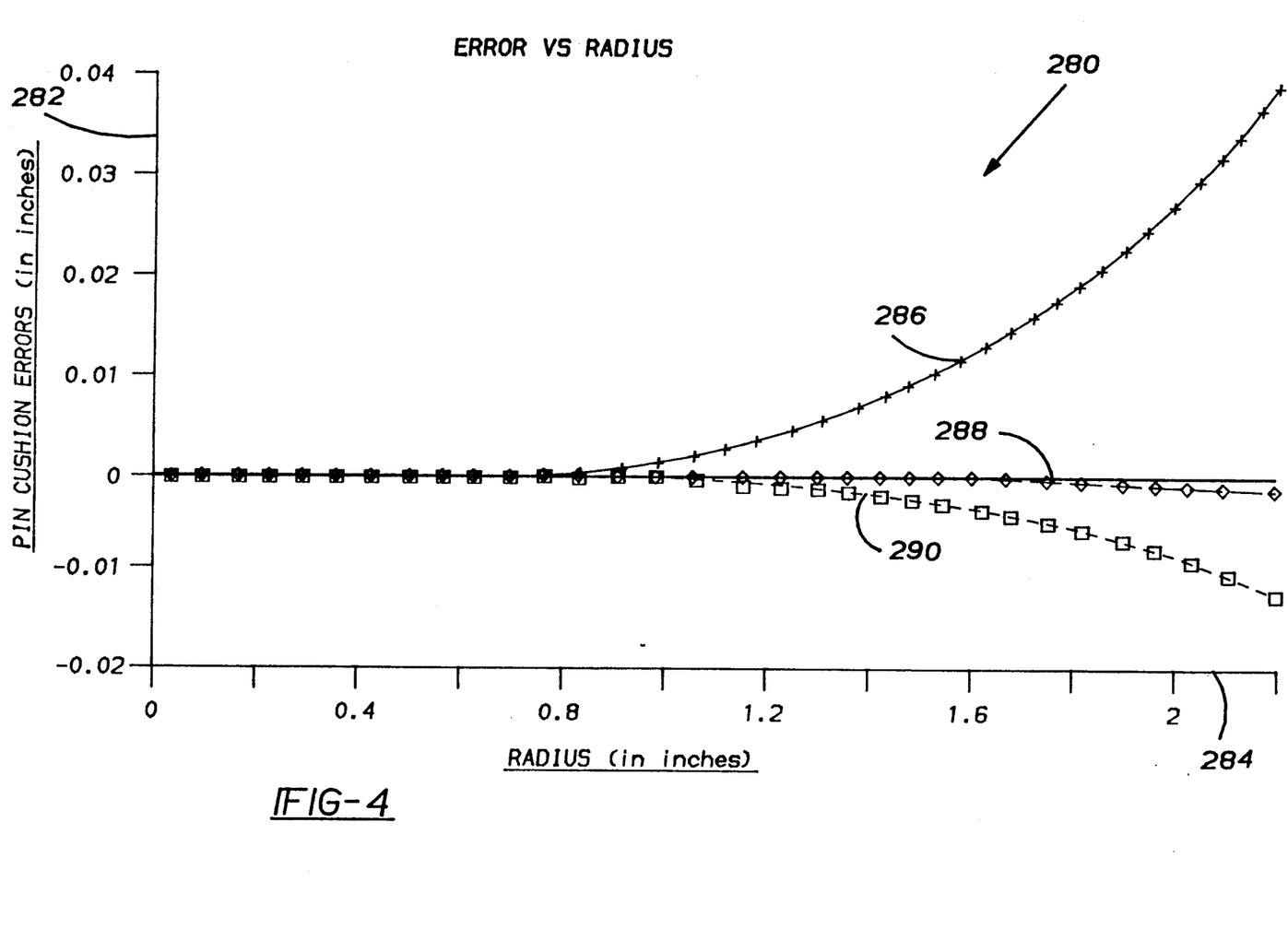
FIG. 4 is a graphical illustration of spherical positional error versus beam radius associated with a cathode ray tube display having a display corrector made in accordance with the teachings of the preferred embodiment of this invention.

Referring now to FIG. 4, the importance of a three term Taylor Series approximation and the use of feedback relative to a polynomial model is therein illustrated. Specifically, graph 280 employs positional error measurement on its vertical axis 282 and a plurality of radii 18 on its horizontal axis 284. Graph 280 represents data produced by a plurality of experiments. Curves 286-290 represent the use of a two term Taylor series polynomial approximation, a polynomial approximation using feedback (i.e. the preferred embodiment of this invention) and a three term Taylor series polynomial approximation without feedback respectively.

As illustrated, curve 288 representing the preferred embodiment of this invention provides the least amount of positional error than do curves 286 or 290. Thusly, the preferred embodiment of this invention produces a relatively large amount of positional distortion correction with a concomitant defocusing correction and utilizes a rather simple electronic design.

It is to be understood that the invention is not limited to the exact construction or method illustrated and described above, but that various changes and modifications may be made without departing from the spirit and scope of the invention as defined in the following claims.

What is claimed is:

1. A display corrector for use with a display having a plurality of positionally distorted points thereon, said points having a vertical and a horizontal positional component defined by a horizontal and a vertical reference axis of said display, said components being represented by horizontal and vertical positional signals generated by said display, said corrector comprising:

(a) programmable correction means, having an input and output, for correcting said positional distortion of one of said points by modelling a correction position gain as separate horizontal and vertical polynomial functions and wherein said positional signals provide for an undistorted position are modeled by $$X'(v) = X_v - G_x A_x \text{ and}$$

$$Y'(v) = Y_v - G_y A_y$$

wherein $X'(v)$ is a drive signal provided to achieve an undistorted horizontal positional component and $Y'(v)$ is a drive signal provided to achieve an undistorted vertical positional component, $X_v$ and $Y_v$ denote signals associated with distorted horizontal and vertical distorted positions, respectively, of said point positioned upon said display, $G_x$ and $G_y$ denote gains associated with correcting the respective positional distortion of said point, $A_x$ and $A_y$ denote respective polynomial functions;

(b) first coupling means for coupling said horizontal and vertical positional signals of said point to said input of said correction means;

(c) second coupling means for coupling said output of said programmable correction means to said input of said programmable correction means; and (d) output circuitry having an input and output, wherein said input is coupled to said output of said correction means and wherein said output of said circuitry is coupled to said display, for coupling said output of said correction means to said display for correcting said positional distortion.

2. The corrector of claim 1 wherein each of said points is horizontally and vertically defocused and wherein said corrector further comprises:

(e) focusing means, coupled to said correction means, for providing output signals for horizontally and vertically focusing said point.

3. The corrector of claim 1 wherein said horizontal and vertical positional signals have a characteristic amplitude wherein said correction means comprises:

(a) a first multiplier means having an input coupled to said positional signals and an output, for doubling said characteristic amplitude of said signals;

(b) operational amplifier means, having an input coupled to said output of said first multiplier means and an output, for summing said output of said first multiplier means;

(c) second multiplier means, having an input coupled to said output of said operational amplifier means and to said positional signals and also having an output coupled to said input of said first multiplier means, for multiplying together said positional signals and said output of said operational amplifier; and (d) programmable resistor means coupled to said output of said second multiplier means and to said input of said output means for programmably correcting said positional distortion of said point.

4. The corrector of claim 3 wherein said focusing means comprises:

a potentiometer coupled to said output of said operational amplifier means.

5. The corrector of claim 3 wherein said output means comprises:

a first operational amplifier having an input and output;

third coupling means for coupling said input of said first operational amplifier to said programmable resistor means and to said positional signals;

a second operational amplifier, having an input and output;

fourth coupling means for coupling said input of second operational amplifier to said programmable resistor means and to said positional signals; and fifth coupling means, coupled to said output of said first and second operational amplifiers, for coupling said outputs of said first and second operational amplifiers to said display whereby said horizontal and vertical spherical distortion of said point is corrected.

6. The corrector of claim 1 further comprising:
offset means, coupled to said output means, for aligning said correction means with said vertical and horizontal axes of said display.

7. A display corrector for use with a display having a plurality of positionally distorted points thereon, said points having a vertical and a horizontal positional component defined by a horizontal and a vertical reference axis of said display, said components being represented by horizontal and vertical positional signals having a characteristic amplitude and generated by said display wherein said corrector models correction position gain as separate horizontal and vertical polynomial functions, said corrector comprising:

(a) first multiplier means, having an input coupled to said positional signals of one of said points and an output, for doubling said amplitude of said positional signals;

(b) operational amplifier means, having an input coupled to said output of said first multiplier means and an output for summing said output of said first multiplier means, (c) second multiplier means, having an input coupled to said output of said operational amplifier means and to said positional signals and also having an output, for multiplying together said positional signals and said output of said operational amplifier means;

(d) coupling means, coupled to said output of said second multiplier means and to said input of said first multiplier means for coupling said output of said second multiplier means to said input of said first multiplier means;

(e) programmable resistor means coupled to said output of said second multiplier means and to said display through circuitry for programmable defining position of said point upon said display; and (f) wherein said positional signals provide for an undistorted position are modelled by $$X'(v) = X_v - G_x A_x \text{ and}$$

$$Y'(v) = Y_v - G_y A_y$$

wherein $X'(v)$ is a drive signal to achieve an undistorted horizontal positional component and $Y'(v)$ is a drive signal to achieve an undistorted vertical positional component, $X_v$ and $Y_v$ denote signals associated with distorted horizontal and vertical distorted positions, respectively, of said point positioned upon said display, $G_x$ and $G_y$ denote gains associated with correcting the respective positional distortion of said point, and $A_x$ and $A_y$ denote respective polynomial functions.

8. The corrector of claim 7 wherein each of said points is horizontally and vertically defocused and wherein said corrector further comprises:

(f) focusing means, coupled to said operational amplifier means, for providing output signals for horizontally and vertically focusing said point.

9. The corrector of claim 8 wherein said focusing means comprises:
a potentiometer.

10. The corrector of claim 8 further comprising:
output means, coupled to said programmable resistor means and to said display for coupling said defined position to said display.

11. The corrector of claim 8 wherein said output means comprises:

a first operational amplifier having an input and output;

first coupling means for coupling said input of said first operational amplifier to said programmable resistor means and to said positional signals;

a second operational amplifier, having an input and output;

second coupling means for coupling said input of second operational amplifier to said programmable resistor means and to said positional signals; and third coupling means for coupling said outputs of said first and second operational amplifiers to said display whereby said defined position is coupled to said display.

12. The corrector of claim 11 further comprising:
offset means, coupled to said input of said first and second operational amplifiers, for aligning said corrector with said vertical and horizontal axes of said display.

13. A method for correcting spherical distortion of a point positioned upon a flat faced portion of a display, said display having a horizontal and vertical reference axes, said axes defining a horizontal and a vertical positional component of said point and wherein said display representing said positional components by signals having a characteristic amplitude, said method comprising:

(a) providing a programmable distortion correction means, having an input and an output for programmable correcting said spherical distortion of said point by modeling a correction position gain as separate horizontal and vertical polynomial functions;

(b) inputting said horizontal and vertically positional signals to said input of said correction means;

(c) aligning said correction means to said horizontal and vertical axis of said display;

(d) programming said programmable distortion correction means, wherein a corrected horizontal and vertical positional component of said point being defined;

(e) coupling said output of said distortion correction means to said display through circuitry and to said input of said programmable correction means whereby said horizontal and vertical spherical distortion of said point is corrected; and (f) wherein the signals having a characteristic amplitude are modelled by $$X'(v) = X_v - G_x A_x \text{ and}$$

$$Y'(v) = Y_v - G_y A_y$$

wherein X'(v) is a drive signal to achieve an undistorted positional component and Y'(v) is a drive signal to achieve an undistorted verical positional component, $X_v$ and $Y_v$ denote signals associated with distorted horizontal and vertical distorted position, respectively, of said point positioned upon said display, $G_x$ and $G_y$ denote gains associated with correcting the respective positional distortion of said point, and $A_x$ and $A_y$ denote respective polynomial functions.

14. The method of claim 13 wherein said point is horizontally and vertically defocused wherein said method further comprising:

providing focusing means, coupled to said correction means, for horizontally and vertically focusing said point 15. A method for correcting horizontal and vertical distortion of a point positioned upon a flat faced portion of a display wherein said display having a horizontal and a vertical axis, said axes respectively defining horizontal and vertical positional components of said point, said method comprising:

(a) measuring said horizontal and vertical position of said points upon said display;

(b) modeling said corrected horizontal position as a first polynomial function of said measured horizontal position, a first horizontal correction gain, and a first feedback factor wherein said function is defined by subtracting a multiplication product of said first correction gain and said first feedback factor from said measured horizontal position;

(c) modeling said corrected vertical position as a second polynomial function of said measured vertical position, a second vertical correction gain and a second feedback factor wherein said function is defined by subtracting a multiplication product of said second correction gain and said second factor from said measured vertical position;

(d) expanding said first and second polynomial functions into separate Taylor series;

(e) truncating both series after three terms;

(f) calculating said first and second correction gains from said second term of each series;

(g) defining said first and second feedback factors by said third term of each series;

(h) providing circuit means, having an input coupled to said positional signals and an output coupled to said display, for electronically correcting said vertical and horizontal position of said point according to said first and second correction gains and for electronically producing and outputting a feedback signal according to said defined feedback factors; and (i) coupling said feedback signals to said input of said circuit means.

16. The method of claim 15 wherein said point is horizontally and vertically defocused wherein said method further comprising:

providing focusing means, coupled to said circuit means, for horizontally and vertically focusing said point.

17. The method of claim 15 wherein said method further comprising:

providing offset means, coupled to said circuit means, for electronically aligning said circuit means with said vertical and horizontal axis of said display.

* * * * *